March 1, 1966     J. E. HAMILTON, SR     3,237,567
FLUID DISPLACEMENT DEVICE
Filed June 17, 1963
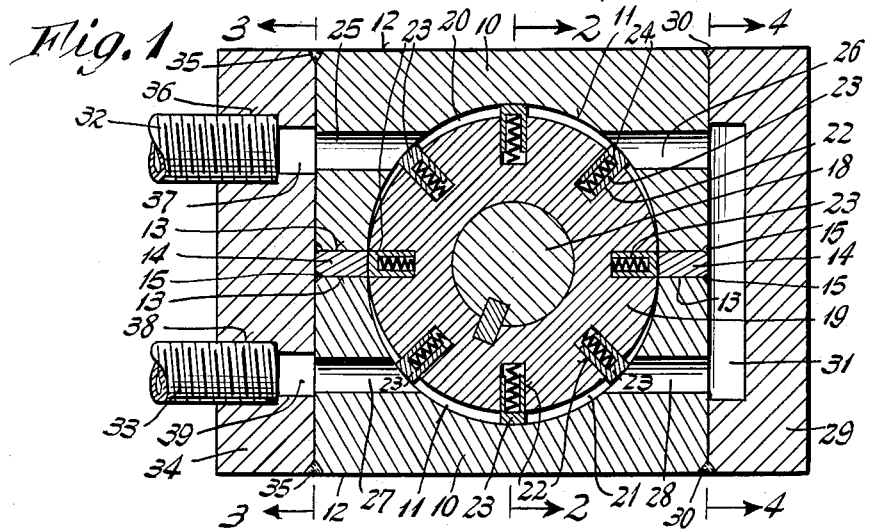
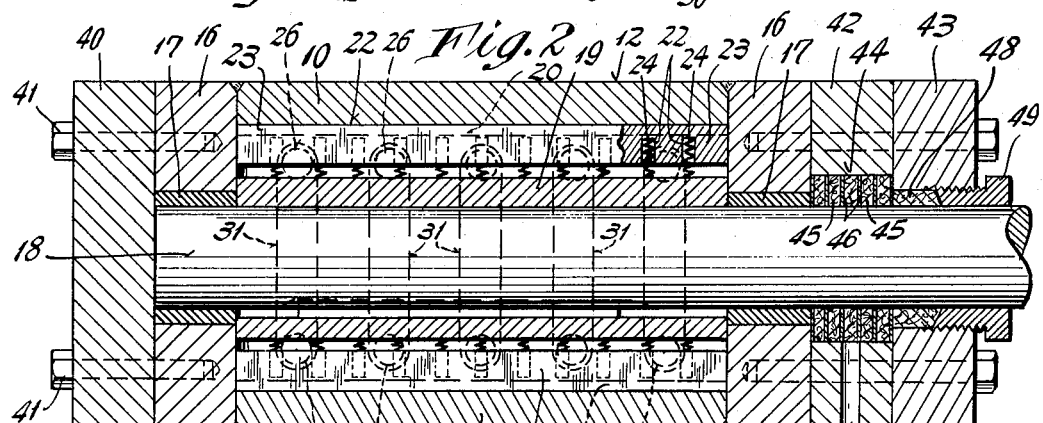
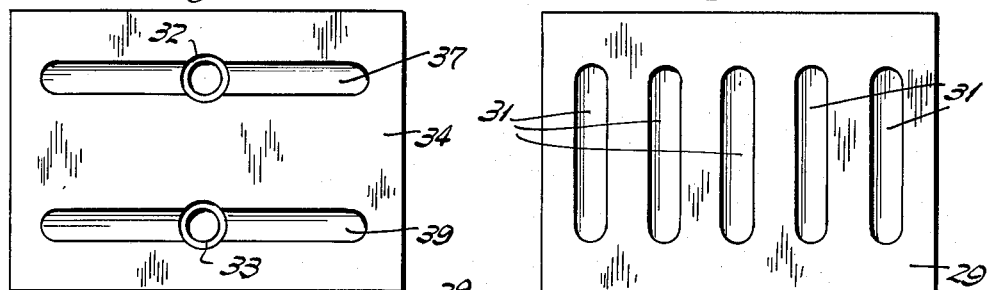
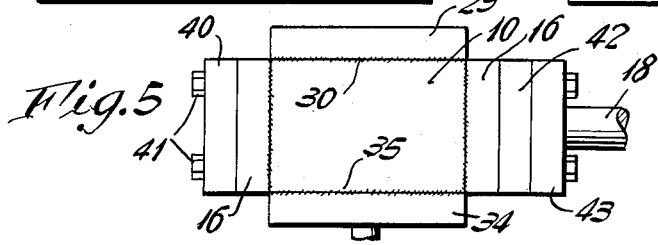
INVENTOR.
John E. Hamilton, Sr.
BY
Johnson and Kline
ATTORNEY

United States Patent Office 3,237,567
Patented Mar. 1, 1966

3,237,567
FLUID DISPLACEMENT DEVICE
John E. Hamilton, Sr., West New York, N.J.
(Box 119, New Waterford, Ohio)
Filed June 17, 1963, Ser. No. 288,367
7 Claims. (Cl. 103—136)

This invention relates to an improved fluid displacement device which is capable of use either as a fluid motor or fluid pump.

An object of this invention is to provide such a device which is efficient and reliable and economical to manufacture. To this end, the displacement device of this invention comprises rugged parts which are relatively easy to make and assemble.

The present invention, in the form shown as exemplary thereof, comprises a cylinder having a shaft mounted to rotate in a cavity which is approximately oblate in cross-section in the stationary part of the device and having radially disposed vanes in the cylinder riding on the surface of the cavity and functioning to force fluid from an inlet to an outlet when the device is operating as a pump and power is applied to the cylinder or to be engaged by fluid under pressure to cause the cylinder and its shaft to be rotated when fluid is forced into the cavity from a fluid inlet when the device is used as a motor.

A further feature of this invention is the provision of such a rotary fluid displacement device in which the cylinder is centrally located in the cavity so that fluid in crescent-shaped passages between the cavity and the cylinder are provided on diametrically opposite sides of the cylinder, and said fluid passages are such that fluid passing through the device may engage or be engaged by the vanes twice in each revolution of the cylinder in passing between the inlet and the outlet port. By these means, the optimum displacement and power of the device can be obtained while the lateral thrust on the surfaces of each of the diametrically opposite vanes would be reduced by one half thereby reducing friction between the faces of the vanes and the slots containing them.

According to this invention, the cylinder and cavity may and preferably are substantially longer than the diameter of the cylinder and the width of the body so that a device of optimum capacity may be produced without increasing the transverse dimensions of the device, thereby facilitating the installation of the device in narrower spaces than would otherwise be possible.

Another feature of this invention is the provision of the fluid passages in an elongate fluid displacement device in such a way as to guide the fluid into the cavities in what might be termed "jet streams" in planes substantially parallel to the tangent of the cylinder, thereby avoiding the turbulence and/or unequal flow of the fluid to the space between the cylinder and the wall of the cavity which is likely to occur if the fluid were introduced as a single wide stream extending for the full length of the cylinder.

Another important feature of this invention is the provision of a device that may be made of easily formed or machined parts and which may be assembled and united as by welding to form a solid rugged structure.

Since the device is symmetrical at opposite sides of its horizontal center line, the rotation of the cylinder and hence the shaft may be reversed by merely employing a duplex reversing valve between a port on one side of the center line and a port at the other side of the center line.

Other features and advantages will hereinafter appear.

In the accompanying drawings—

FIGURE 1 is a transverse section of a fluid displacement device made according to the present invention.

FIG. 2 is a vertical longitudinal section of the device taken on the line 2—2 of FIG. 1.

FIG. 3 shows an elevation of one of the side plates of the device.

FIG. 4 is an elevation of the other of the side plates of the device.

FIG. 5 is a plan view showing the assembled fluid displacement device.

As shown in the accompanying drawings, the fluid displacement device of this invention comprises a pair of blocks 10 which may be identical in every respect and this is advantageous since the blocks may be made from the same pattern and/or machined with the same tools and jigs. Each block 10 has a hemicylindrical cavity 11 formed therein having a determinate radius and a determinate length extending to the ends of the block. Except for the presence of the cavity 11, the blocks are preferably rectangular and have an outer flat surface 12 and inner flat surfaces 13 parallel with the surface 12 and located in the plane of the axis of the hemicylindrical cavity 11. Since the cylinder cavities 11 in the two blocks 10 are the same, in making the blocks they may be bored and honed in a single operation after the blocks have been securely clamped together.

The blocks 10 have interposed between their surfaces 13 rectangular strips 14 each having a length equal to the length of the blocks and a width equal to the width of the surfaces 13 of the blocks. The strips 14 are secured to the blocks 10 by welds 15 to form a unitary open-ended casing. The strips 14 initially may be slightly wider than the surfaces 13 so as to project somewhat into the cavity so that, after the blocks 10 and strips 14 have been united, a suitable tool, such as a reamer or milling cutter having the same diameter as the cavity, may be used to cause the inner surfaces of the strips to be in a plane tangential to the surface of the hemicylindrical cavities. The blocks 10 and the strips 14 thus produce an oblate cylindrical cavity within the unit.

The device also includes end plates 16 which may be identical and which close the ends of the hemicylindrical cavity 11. The end blocks 16 are preferably rectangular and each has a width and length equal to the width and height of the assembled blocks 10 and strips 14. Each end plate 16 has a bearing 17 for a shaft 18.

A cylinder 19 is mounted on and splined to the shaft 18 so as to be confined by the end plates for rotation in the cavity 11. Since the cylinder 19 has substantially the same diameter as the hemicylindrical cavities in each block 10 (any differences being to allow for clearance and tolerance), due to the presence of the strips 14, crescent-shaped spaces 20 and 21 exist between the cylinder 19 and the walls of the oblate cylindrical cavity. These spaces 20 and 21 are in communication with passages in the blocks leading to the exterior of the blocks.

The cylinder 19 has a series of equispaced radial slots 22 in each of which there is located a radially movable vane 23 each resiliently urged outwardly against the surface of the oblate cylindrical cavity by a plurality of equispaced springs 24. The vanes 23 carry fluid through the crescent-shaped spaces 20 and 21 as the cylinder 19 and shaft 18 are power operated when the device is acting as a pump, and are engaged by the fluid to drive the cylinder and shaft when the device is acting as a motor.

It will be noted that in order to provide for a device to be installed in narrow places having relatively limited vertical spaces and yet have the required capacity, the device of this invention is elongate and has a length substantially greater than its width and height. So that this may be done and yet permit the fluid to be applied to the vanes or to be impelled by the vanes more uniformly over the entire length of the cylinder, the present invention, instead of providing single passages extending across the length of the device and opening into the spaces 20 and 21 between the cylinder and the oblate cylindrical cavity, provides longitudinal rows of holes 25, 26, 27 and 28, each row having a plurality of substantially equispaced holes and each hole extending from the outer surface of its block to its associate space 20 or 21 in the cavity and in a direction parallel to the horizontal plane in which the axis of the cylinder 19 lies. Each hole 25 at one side of the block is coaxial with a hole 26 at the other side and each hole 27 in the other block is coaxial with a hole 28 opposite it, and therefore each pair of coaxial holes 25 and 26 may be drilled in one pass of a drill or may be formed by a single core, and the same is true of each pair of coaxial holes 27 and 28, thus effecting a saving in the cost of manufacturing the device.

In order to connect the holes 26 and 28 for the passage of fluid between them, the device is provided with a side plate 29 having the same length as the blocks 10 and the same height as the assembled unit consisting of the blocks 10 and strips 14. The side plate 29 is welded to the blocks 10 and strip 14 by welds 30 along the perimeter of the surface facing the blocks to make a fluid tight connection therewith. The side palte 29 has a plurality of vertical channels 31 each aligned with a pair of holes 26 and 28 through which fluid may be conducted between these holes.

To connect the holes 25 with a conduit 32 and the holes 27 with a conduit 33, the device has a side plate 34 which, like the side plate 29, has the same length as the blocks 10 and the same height as the assembled unit consisting of the blocks 10 and strip 14 and it is welded to the blocks 10 and the strip 14 by welds 35 along the perimeter of the surface facing the blocks.

The side plate 34 has a threaded hole 36 to receive the conduit 32 and a longitudinal channel 37 aligning with the row of holes 25 so that fluid may flow between the conduit 32, the channel 37 and the holes 25. The plate 34 has a threaded hole 38 to receive a conduit 33 and a longitudinally extending channel 39 aligned with the row of holes 27 so that fluid may pass between the conduit 33, the channel 39 and the holes 27.

From the above it will be understood that when the device is functioning as a pump and the fluid enters the channel 37 from the conduit 32, it will be distributed along the channel and pass in streams through the holes 25 and enter the space 20. As the cylinder rotates, the next vane to cross the holes 25 will trap the fluid between itself and the vane ahead of it and carry it around to the holes 26 into which it will be discharged. From the holes 26 the fluid will pass through the channels 31 to the holes 28 and into the space 21 between the cylinder and the blocks and will be trapped therein by the next approaching vane and finally be discharged through the holes 27 to the channels 39 and from the latter to the conduit 33.

When the device is used as a motor, fluid entering the holes 25 through the conduit 32 and channels 37 will impinge upon a vane 23 and cause the cylinder and shaft to rotate in a clockwise direction as viewed in FIG. 1, the fluid being discharged into the holes 26 and passing from the holes 26 through the channels 31 to the holes 28 where it again impinges upon a vane and finally is discharged through the holes 27 and the conduit 33.

Since the device of the present invention is completely symmetrical on each side of its horizontal center line, it will be understood that when used as a motor, for instance, if fluid under pressure is introduced to the holes 27 through the channels 39 and conduit 33, the direction of rotation of the shaft 18 will be counterclockwise as viewed in FIG. 1, and the flow of fluid will be the reverse of that above described, the fluid finally emerging from the conduit 32.

At one end of the device the shaft 18 terminates at the end of the bearing 17 and the hole in the end plate and bearing is closed against leakage of fluid by an outer end plate 40 which is fastened to the adjacent end plate 16 by suitable means, such as bolts 41.

At the other end of the device the shaft 18 projects beyond the end plate 16 through an intermediate plate 42 and beyond an outer end plate 43 where it may be connected to means to drive, or to be driven by, the shaft. The intermediate plate 42 has a central hole 44 substantially larger than the diameter of the shaft and providing a recess in which there is provided wicking 45 separated by washers 46 and which is adapted to collect any oil or other fluid which may seep between the adjacent bearing and the shaft. The hole 44 is in communication with a hole 47 in the plate 42 going to the exterior of the device so that any accumulation of oil or fluid may be drained off.

The outer plate 43 is provided with a packing gland 48 and a threaded bushing 49 which may be adjusted to provide the desired pressure to prevent leakage of the fluid through the plate 43 to the exterior of the device.

Variations and modifications may be made within the scope of the claims and portions of the improvements may be used without others.

I claim:

1. A fluid displacement device comprising as haft; a cylinder on the shaft having a driving connection therewith; a plurality of longitudinally extending arcuately equispaced vanes carried by and radially movable relative to said cylinder; said cylinder being enclosed and supported by a casing consisting of an upper stationary block and a lower stationary block, each block having a hemicylindrical cavity, the radius of which is substantially the same as the radius of the cylinder and the length of which is substantially the axial length of the cylinder, the surfaces 13 or each block at opposite sides of the cavity being in the plane of the diameter of the cavity, each said block having ingress and egress passages leading to the hemicylindrical cavity; a pair of elongate bars each having a length which is equal to the length of the cylinder and a width equal to the width of said surfaces 13 at opposite sides of the cavity; means integral with the blocks and the bars for securing the blocks and the bars together with the bars interposed between and in alignment with said surfaces 13 of the blocks at opposite sides of the cavity to form a unitary casing having a cylinder-like cavity, approximately oblate in cross section, within which the cylinder rotates; means for causing said vanes to engage the oblate-cylindrical surface of the cavity as the shaft rotates to confine fluid between adjacent vanes; a side plate secured to each side of said blocks, each side plate having fluid passages therein; said ingress and egress passages in each block comprising a plurality of longitudinally spaced holes, each said hole opening at one end in the space between the oblate-cylindrical cavity in the blocks and the cylinder and at the other end into the passages in the adjacent side plate; and end plates secured to said blocks for closing the ends of said cylinder-like cavity and having bearings for said shaft.

2. A fluid displacement device according to claim 1, in which the side plates are respectively secured to opposite longitudinal sides of the casing by welds to make a fluid tight seal between the side plates and the casing and to form an integral part thereof.

3. A fluid displacement device according to claim 1, in which the holes are located in opposite sides of each of the blocks and the holes in one side of each block are in axial alignment with the holes in the other side of the block.

4. A fluid displacement device according to claim 1, in which the holes in one of the blocks are parallel to the holes in the other block.

5. A fluid displacement device according to claim 1, in which one of the side plates has channels providing communication between the holes in one of the blocks and the holes in the other block.

6. A fluid displacement device according to claim 1, in which one of the side plates has two channels, one connecting all of the adjacent holes in one block and the other connecting all of the adjacent holes in the other block.

7. A fluid displacement responsive unit according to claim 1, in which one of the side plates has channels providing communication between the adjacent holes in one of the blocks and the adjacent holes in the other block and the other side plate has two fluid connections with the exterior of the unit and two channels extending parallel with the axis of the shaft, one channel providing communication between the adjacent holes in one of the blocks and one of said fluid connections with the exterior of the unit and the other channel providing communication between adjacent holes in the other block and the other fluid connection with the exterior of the unit, whereby fluid may flow into and through the fluid connection in one side plate, the channel between the holes in said side plate, the holes in the block, the space between the oblate-cylindrical cavity and the cylinder, the opposite holes in the same block, the channels in the other side plate, the holes in the other block, the space between the oblate-cylindrical cavity and the cylinder, the channels in the first side plate and the connection from the latter to the exterior of the unit.

References Cited by the Examiner

UNITED STATES PATENTS

| | | | |
|---|---|---|---|
| 861,344 | 7/1907 | Wright | 91—140 |
| 1,087,181 | 2/1914 | Pitman | 103—136 |
| 1,718,535 | 6/1929 | Cuthbert | 230—153 |
| 2,007,954 | 7/1935 | Carlson | 29—156.4 |
| 2,112,522 | 3/1938 | Czarnecki et al. | 103—5 |
| 2,330,565 | 9/1943 | Eckart | 103—136 |
| 2,724,173 | 11/1955 | Girard | 29—156.4 |

FOREIGN PATENTS 16,161   1897   Great Britain.

DONLEY J. STOCKING, *Primary Examiner.*

JOSEPH H. BRANSON, Jr., KARL J. ALBRECHT, *Examiners.*